United States Patent [19]

DiNicolantonio et al.

[11] 4,133,852
[45] Jan. 9, 1979

[54] HINGED PRESSURE RELIEF TRAY

[75] Inventors: Arthur R. DiNicolantonio, Madison, N.J.; Humphrey R. Theysen, Cura Cabay, Netherlands Antilles

[73] Assignee: Exxon Research & Engineering Co., Florham Park, N.J.

[21] Appl. No.: 722,871

[22] Filed: Sep. 13, 1976

[51] Int. Cl.² .............................................. B01F 3/04
[52] U.S. Cl. .......................... 261/114 TC; 137/513.3; 202/158; 261/62; 261/109; 261/114 VT
[58] Field of Search ...................... 261/44 R, 113, 109, 261/114 R, 114 A, 114 JP, 114 VT, 114 TC, 110, 62; 202/158; 137/511, 512.1, 513.3, 527.8, 533, 533.17

[56] References Cited

U.S. PATENT DOCUMENTS

| 2,045,518 | 6/1936 | Chatfield | 261/114 VT |
|---|---|---|---|
| 2,809,821 | 10/1971 | Constantikes | 261/114 VT |
| 2,846,204 | 8/1958 | Gilmore | 261/114 VT |
| 2,982,527 | 5/1961 | Eld et al. | 261/114 VT |
| 3,105,862 | 10/1963 | Doering, Jr. | 261/114 R |
| 3,140,729 | 7/1964 | Mercier | 137/513.3 X |
| 3,222,040 | 12/1965 | Eckert | 261/113 X |
| 3,325,155 | 6/1967 | Bahout | 261/113 |
| 3,696,832 | 10/1972 | Maurice et al. | 261/114 VT X |
| 3,807,711 | 4/1974 | Hirao et al. | 261/44 R |
| 3,996,317 | 12/1976 | Sarmiento et al. | 261/113 X |

Primary Examiner—Richard L. Chiesa
Attorney, Agent, or Firm—F. Donald Paris

[57] ABSTRACT

A hinged tray, preferably for use in fractionation towers, capable of relieving small but sudden pressure surges caused by the flashing of relatively small amounts of water remaining in the tower feed or in the stripping steam. By hinging the trays distortion and upset normally caused by the flashing which could cause damage to the trays is substantially eliminated, as well as costly shutdown of the towers for tray repair. The hinged portion of the tray is stiffened by means of a frame and a counterweight can be provided to eliminate tray vibration during normal operation.

13 Claims, 5 Drawing Figures

HINGED PRESSURE RELIEF TRAY

BACKGROUND OF THE INVENTION

Typically in most fractionation processes, e.g. atmospheric fractionation of crude oil, it is very difficult and just about impossible to remove all of the water in the feed to the fractionation tower. In a typical tower, flashing of only one-third of a cubic foot of water in one second will cause a differential pressure of 1.5 to 2.5 pounds per square inch across each of the usual vertically stacked fractionation trays in the tower. Such a differential pressure is sufficient to distort and upset the trays and thus cause a loss of fractionation capacity in the tower. In such a process, water is typically found in the feed or can be trapped in the tower from washing operations or can result from condensing of stripping steam from which it cannot be completely eliminated and thereby avoid flashing and potential damage to the fractionation trays. In the event of damage to the tray as a result of a sudden pressure surge resulting from the flashing of the water, the fractionation capacity of the tower is impaired when the trays are damaged, a shut-down of the unit for tray repair or replacement is required. This repair causes loss in plant production and results in considerable mechanical maintenance costs.

While a large number of arrangements and variations for pressure surge relief have been attempted, they have been found to be uneconomical for use in existing fractionation towers since they cause loss in liquid-vapor contact area or fractionation capacity. Problems with the prior art have included high cost, insufficient vapor relief capacity, reduction of fraction capacity, coking in dead flow areas caused by the location of the pressure relief device and in general, prior art systems are not universally applicable to all types of fractionation towers. For example, the Chatfield U.S. Pat. No. 2,045,518 discloses a pressure relief arrangement for relieving pressure surges, but is only applicable to towers with bubble trays and not to present day towers in which all available tray space is used for vapor-liquid contact. Installation of this type of device in the present tower will severely reduce fractionation capacity and results in coking in the dead flow zones of the port covers on many surfaces. Further, these ports do not have pressure relieving capacity.

Parsons U.S. Pat. No. 2,105,501 discloses a circular pressure relief disc which blocks off a considerable portion of the fraction area of the tower and therefore is very uneconomical. Replacement in existing towers would require complete overhaul of tower internals, reduction in tower capacity and dead flow zones and coke formation in many areas.

Constantikes U.S. Pat. No. 2,809,821 has no pressure surge relieving capability, is extremely complicated and is an expensive tray to build.

Gilmore, U.S. Pat. No. 2,846,204 employs plate valves for providing vapor-liquid contacting and which also have the capability of absorbing some pressure surge; however, this prior art tray is extremely expensive and is not generally applicable to any service because of its special design. Typically, the valves would be unreliable and subject to sticking and jamming in a number of instances.

The Doering U.S. Pat. No. 3,105,862 employs variable opening jet tabs which possibly could absorb relatively small surges. However, such a tray employs only about 20% of its area for vapor liquid contact and cannot possibly absorb the magnitude of pressure surge absorbed by the present invention. The tray of this type is more expensive and extremely limited in utility, as well as subject to coking.

Other patents which have been located are Uitti U.S. Pat. No. 3,632,315 and Boon U.S. Pat. No. 3,649,466, neither of which disclose the structure or the pressure surge relieving capabilities of the present invention. Also, Hirao U.S. Pat. No. 3,807,711 and Tjutjunnikov et al. U.S. Pat. No. 3,817,501 disclose specific fractionation tray designs which attempt to improve vapor-liquid contacting over broad but limited ranges of vapor-liquid loadings. While it is possible that these disclosures could provide some slight pressure relieving capability, no disclosure is made thereof and they are not deemed to disclose the present invention. None of these patents disclose an arrangement or tray construction wherein the tray is returned to its normal operating position if a pressure surge occurs or restrains relatively minor undesirable variations in the vapor-liquid contact area during normal operation.

SUMMARY OF THE INVENTION

Accordingly, there is provided according to the present invention a hinged pressure relief tray for use in fractionation towers without causing loss in liquid-vapor contact area or loss of fractionation capacity. The tray according to the present invention is capable of relieving large pressure surges caused by flashing of water in the feed, or process upsets resulting from the dumping of large quantities of gas into an operating fractionation tower. More particularly, there is provided a tray mounted in a fractionation tower which includes one or more sections hinged at one end and free for upward pivotal movement at the opposite end thereof. No hold-down clips are provided for that particular tray section. Thus, the tray can swing up and relieve pressure surges caused by the flashing of water or the dumping of gas into the towers. The tray then is allowed to return to its normal position with the fixed tray sections, after the flash has subsided. On the underside of the tray there is provided a frame as well as a counterweight which may be part of the frame or separate. The weight preferably is at the opposite or free end and substantially eliminates tray vibration during normal operation. The counterweight typically may be of such a size to provide a returning force moment which is fifty percent greater than the normal vapor pressure drop through the tray which would cause it to lift from its support during normal operation. Accordingly, the weight would be typically between 40 and 50 pounds and preferably is made of the same material as the tray.

The foregoing and other objects, features, advantages of the invention will be apparent from the following more particular description of the preferred embodiment of the invention as illustrated in the accompanying drawings.

BRIEF DESCRIPTION OF THE DRAWINGS

FIG. 4 is a cross-sectional view taken substantially along the line 4—4 of FIG. 2.

FIG. 5 is a cross-sectional view taken substantially along the line 5—5 of FIG. 2, illustrating the hinged tray section in its pressure surge or uplifted condition in dotted lines.

DETAILED DESCRIPTION OF THE PREFERRED EMBODIMENT

Figure 1:
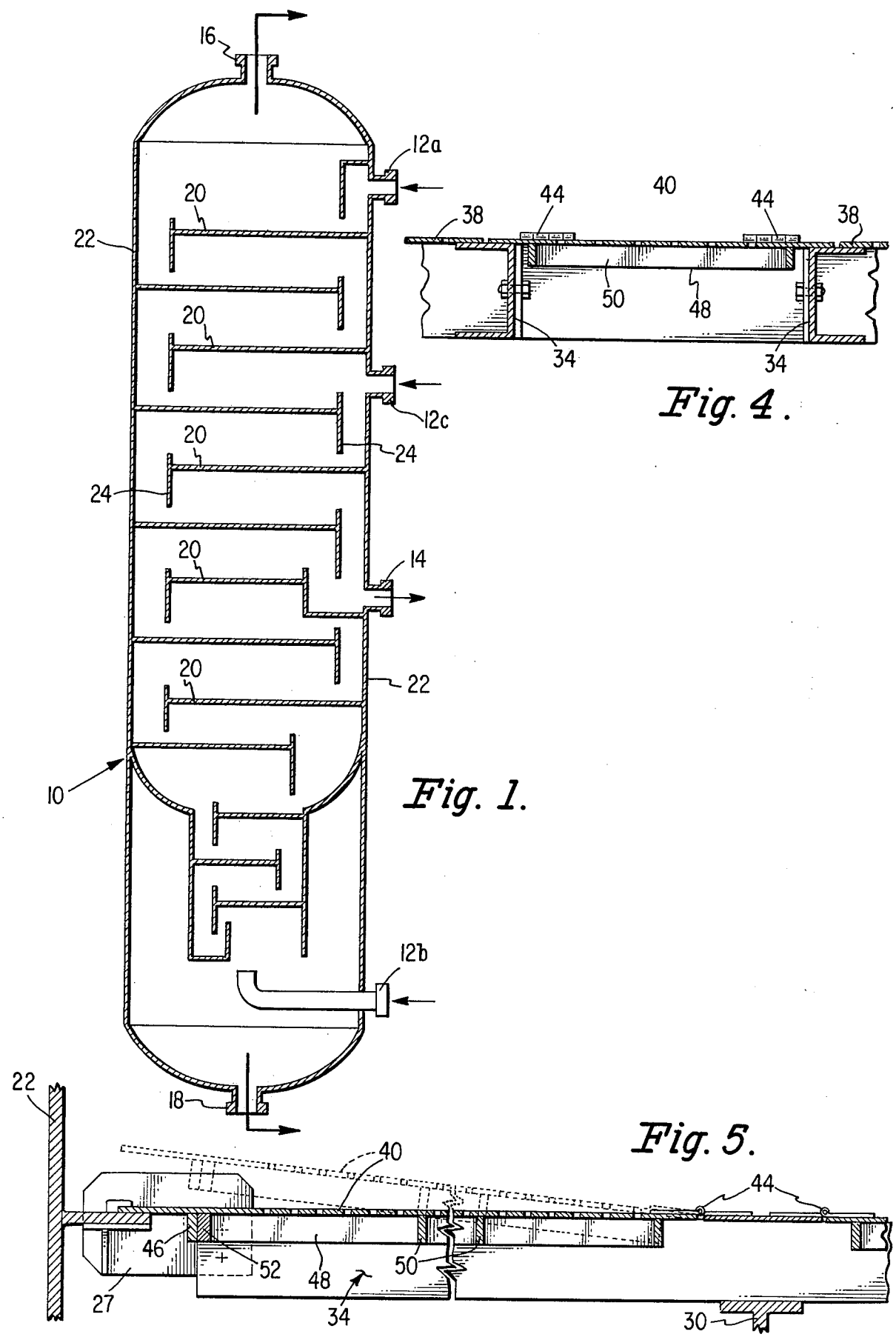
FIG. 1 is a vertical sectional view of a fractionation tower incorporating the present invention.

Referring now to the drawings wherein like parts are designated by the same reference numeral throughout the several views, there is shown in FIG. 1 a typical fractionation tower which would be employed in one of a variety of fractionation processes, for example atmospheric fractionation of crude oil and vacuum fractionation of atmospheric pipestill bottoms. The tower generally designated 10 may be of any suitable or desired type, construction, diameter and height. A plurality of inlet openings 12 the number and size of which will obviously vary depending on the size and use of the column, will permit various feedstreams to enter the column, e.g. reflux inlet at 12a and a stripping steam inlet at 12b and at 12c a process stream inlet. A plurality of outlet openings including the sidestream liquid draw off 14 and the overhead outlet 16 in addition to a bottom drainoff outlet 18 are provided for effluent product and waste streams leaving the column or tower. A plurality of trays 20 extend transversely across the interior of the column at spaced vertical intervals for substantially the complete height thereof. The number and particular spacing of the trays, of course, will be subject to variation in accordance with the size of the tower and its particular use. Each tray is typically mounted at one end to the wall of the tower and at the other end is provided with a standard downcomer or weir portion 24.

Figure 2:
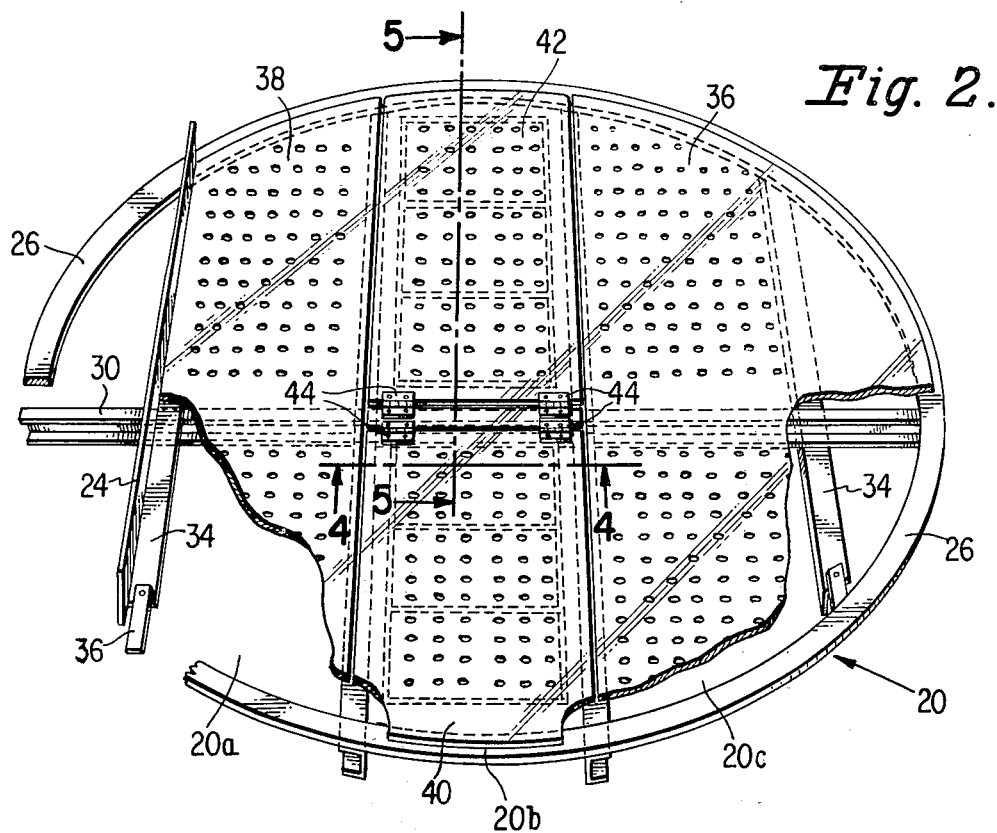
FIG. 2 is an assembly view in perspective of a fractionation tray constructed according to the present invention together with its supports.
Figure 3:
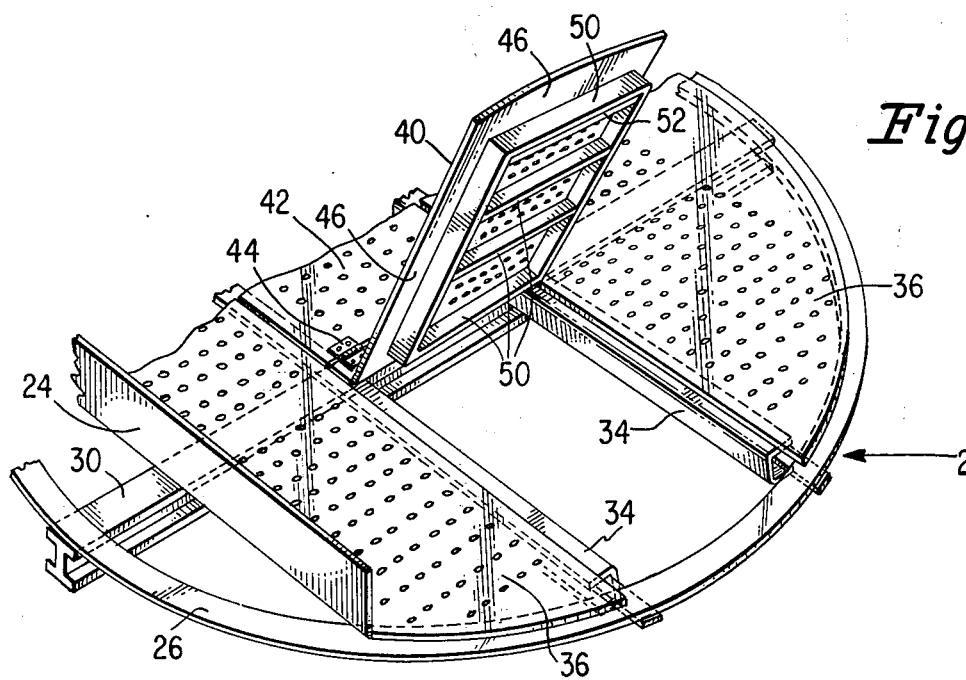
FIG. 3 is a perspective view of a portion of a tray according to the present invention with the hinged tray section in its uplifted or pressure surge condition.

Each of the fractionation trays 20 is best illustrated in the other figures of the drawings, FIG. 2 in particular. Each tray is supported within the tower by a substantially annular flat ring-like member typically referred to as the tray support ring 26, which can be secured to the internal surface of the tower wall 22 by welding or other suitable means. The support ring projects radially inward from the tower wall for supporting the tray on major and minor beams 30 and 34 respectively. The major beam 30 extends diagonally across the tray support ring in the plane of the tower centerline and is secured to the tray support ring at both ends. Extending transversely of the major beam at a number of spaced locations are a plurality of minor beams 34 which are secured by means of clamps 27 to the underside of the support ring 26 to provide still yet further support for the trays. The minor beams are secured to the major beam 30 at the opposite end. Typically, a fractionation tray contains basically three or more chordal sections 20a, 20b, 20c with the center section 20b sometimes containing a removable portion for functioning as a manway in case of need for repair of the tray and access through the tower and other times the entire center tray section 20b is removed for access. As shown in FIG. 2 the tray includes a number fixed tray sections 36, 38 on either side of diametrically opposed hinged tray sections 40, 42. The hinged trays are mounted for pivotal movement to the major beam by means of a pair of U-shaped hinges 44, per se conventional, which are secured at opposite ends transversely of each of the hinged trays spaced along the major beam. Opposite sides of the hinges are mounted with each of the tray sections 40, 42, respectively. The hinged tray is substantially rectangular in shape and extends radially outward toward the tray support ring. Each of the hinged trays include a peripheral ledge 46 such that when the tray is in its closed position the ledge will rest on the underlying portions of the minor beam and the outer most radial portion will rest on the underlying portion of the tray support ring. On the underside side of the hinged section is a frame generally designated 48 which is essentially not the same shape as the tray, containing a plurality of cross-pieces or brackets which provide further rigidity to the tray itself. As best shown in FIG. 5 a counterweight 52, is installed at the free end of the tray at the bottom or underside thereof opposite the hinged end eliminates tray vibration during normal operation of the tray. The location of the weight may vary depending upon the particular moment desired and the operation of the tray and may be located on the top or upper side of the tray if desired.

Typically, the U-shaped hinges can be welded to the trays while being bolted to the major beam. The stiffening frame 48 on the underside of each of the hinged trays typically are welded to the underside of the tray and would consist of a plurality of welded plate members. The counterweight typically may comprise a bar of steel which is welded directly or bolted adjacent the radial outermost plate member of the stiffening frame, although other types of counterweights, e.g. alloy steel, also can be utilized.

While it has been shown that two of the tray sections, located in the center portion, are hinged to provide the pressure surge relieving capability for the tray, it is also within the scope of this invention to employ the expedient of hinging one or more tray sections other than as specifically disclosed and shown. For example, only section 40 may be hinged or if more convenient or necessary sections 36 and 38 also can be hinged.

Referring to FIG. 5, the hinged tray is shown by the dotted lines in its slightly raised or lifted position with respect to its normal operating position in the event that a pressure surge occurs as a result of flashing and the like.

Having thus set forth the nature of the invention which has been particularly shown and described with reference to the preferred embodiment thereof, it will be understood by those skilled in the art that the foregoing and other changes and form and details may be made therein without departing from the true spirit and scope of the invention which are intended to be included in the scope of the appended claims.

What is claimed is:

1. A fractionation tray for a tower for contacting liquid with a vapor and characterized by pressure surges therein during operation, said tray comprising fixed and movable chordal sections disposed in a planar surface during normal operation of said tower, including at least a movable tray section which has a normally closed position, means for supporting said tray in said tower in a substantially horizontal position, said movable tray section being hinged at an end thereof for pivotal upward movement away from said support means in response only to pressure surges of at least a predetermined level in said tower and returning to said normally closed position after said pressure surge has subsided.

2. The tray of claim 1 including at least one fixed tray section.

3. The tray of claim 1 including means operably associated with said movable tray section for minimizing vibration thereof during normal operation of said tower.

4. A fractionation tray for a tower for contacting liquid with a vapor, said tower being characterized by pressure surges therein during operation, said tray being supported within said tower and comprising fixed and movable chordal tray sections including at least one movable tray section having a normally closed position disposed in the same plane with respect to the remainder of said chordal tray sections during normal operation of said tower, said movable tray section mounted at one end thereof for pivotal movement in a direction away from said tray in response only to pressure surges of at least a predetermined level in said tower, thereby providing pressure relief for said tower and whereby said movable tray section resumes its normal closed position upon dissipation of said pressure surge.

5. The tray of claim 4 wherein said tray includes fixed and movable tray sections disposed in a common plane during said normal operation of said tower.

6. The tray of claim 1 including means fixed to the underside of said movable tray section for stiffening said movable tray section and preventing damage thereto during its pivotal movement.

7. The tray of claim 6 wherein said stiffening means comprises a frame secured to the underside of said movable tray section for preventing substantial flexure during the movement.

8. The tray of claim 4 including counterweight means operably connected with said movable tray section for maintaining said tray in its normally closed position during normal operation of said tower.

9. The tray of claim 1 wherein said movable tray section is hinged to a major beam included in the support for said tray and is freely pivotable with respect thereto.

10. The tray of claim 4 including a ledge for supporting said movable tray section in its closed position during normal operation of said tower.

11. The tray of claim 1 including a pair of opposed movable tray sections having fixed tray sections on either side thereof, said movable tray sections hingedly mounted to a major beam of the support for said tray and including an edge for contact with the tray support during normal operation of said tower.

12. The tray of claim 1 including counterweight means at the free end of said movable tray section.

13. The tray of claim 12 wherein said counterweight means is on the underside of said tray section.

* * * * *